Oct. 29, 1957     H. G. LYKKEN     2,811,427
LIGNITE FUEL
Filed Sept. 8, 1952
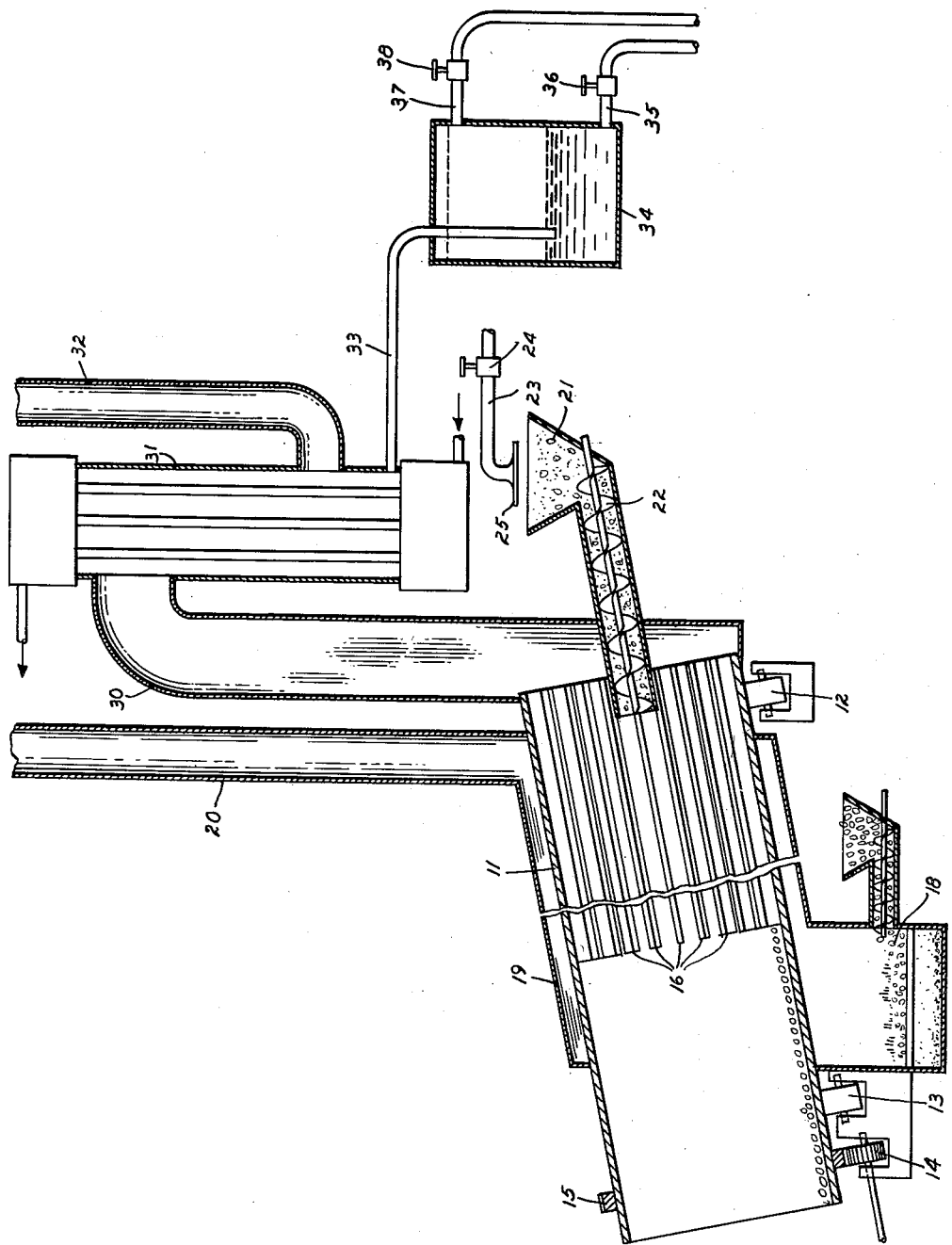
INVENTOR.
HENRY G. LYKKEN
BY
ATTORNEYS

2,811,427

LIGNITE FUEL

Henry G. Lykken, Minneapolis, Minn.

Application September 8, 1952, Serial No. 308,400

2 Claims. (Cl. 44—20)

The present invention relates to a new and improved lignitic fuel, and discloses as well a process of preparing it and an apparatus useful in the preparation of this fuel. This application is a continuation-in-part of my applications Serial No. 52,008, filed September 30, 1948, for "Method and Apparatus for Producing Dehydrated Lignite and Resultant Products," now Patent No. 2,610,115, issued September 9, 1952, and Serial No. 144,804, filed February 17, 1950, for "Lignite Fuel and Process," now abandoned, which are incorporated herein by reference.

In copending application Serial No. 52,008 I have provided a method for producing a moisture-free stable and storable fuel with a relatively high heat value in which the raw lignite is first crushed, then mixed with a relatively small percent of liquid hydrocarbon as it enters a closed externally heated rotary kiln.

The mixture is then progressively heated to about 300° F. in an atmosphere of steam from its own moisture and hydrocarbon vapor resulting from the added oil, both of which of necessity must have a temperature of 400° F. to 500° F. in the direct heated section of the kiln to produce an adequate heat differential between the heating atmosphere and the material to be heated.

The liquid hydrocarbon serves several purposes. It lubricates the lignite particle as it moves through the kiln to minimize degradation due to the rotation of the kiln. It catches the dust that otherwise would go out with the vapor. It provides the hydrocarbon vapor that is absorbed by the dry lignite to stabilize the product by offsetting or neutralizing the activated carbon or open molecular bond effect resulting from heating of lignitic material and making it unstable and subject to spontaneous combustion during the processing as well as in storage. It provides the heavier residual hydrocarbon that serves to seal the surface of the particles against absorbing moisture.

In my application Serial No. 144,804 the successive steps in the process, as far as drying and stabilizing the lignite is concerned, are essentially the same as in Serial No. 52,008, but providing additional steps and features to produce a new and improved substantially bone dry fuel, having a higher net heat content, a fuel in which the oxygen-to-carbon ratio is reduced and which has reduced moisture-sorptive characteristics; where desired, a pelletized fuel more suitable for domestic use, and to provide processes effecting greatly increased economy of operation suitable for commercially making the fuel, and including in the operation of making the fuel, a by-product feature.

The objects of this invention are:

To produce a fuel of hard, dense, clean, dust-free, moisture-resistant character, having a high net heat value and having, when desired, a rounded pellet form.

To produce a fuel that is stable and storable without danger of spontaneous combustion and which is substantially bone dry; a fuel having low moisture-sorptive properties and lowered oxygen-to-carbon ratio.

In the accompanying drawings:

The figure is a diagrammatic side elevation, partly in section, illustrating an apparatus for carrying out the invention.

In carrying out the invention crushed raw lignite is mixed with hydrocarbon oil containing high boiling-point fractions, the total amount of such oil being sufficient to coat the lignite, the oil being sufficient, when the processing is finished, to provide from about 3% to about 10% of oil residue bonded in and on the lignite after the mass is heated to a finishing temperature in the range of about 500° F. to about 750° F. in the presence of autogenously generated superheated steam and oil vapors and while being tumbled on itself. The amount of oil so used must not submerge the lignite particles since it is important, from the standpoint of economy of heat transfer, as hereinafter mentioned, that the interstices between the lignite particles be available for penetration therethrough of the heated vapors of water, which is eliminated from the lignite itself, and oil vapors, since these aid in heat transfer.

The maximum size of the lignite chunks or particles, the percentage by weight of fines, and the particle size analysis of the fines are not critical factors.

The lignite, as crushed usually has enough coarse and fine particles to serve well for the process. Thus, the lignite is mined, crushed, sent over a sizing screen to take out all pieces over a prescribed size (such as ½ inch or whatever size is chosen) and all that passes through the screen (such as ½ inch size if that is chosen and smaller particles down to dust sizes) are then used.

In order to reduce the processing time in the continuous process hereinafter described, I prefer to crush the lignite to a size not greater than 1 inch mesh size; good economy is had by crushing to ½ inch mesh size. Heat penetrates into a ½ inch size particle in roughly one-fourth the time required for a 1 inch size particle; hence from the commercial standpoint and with a view to reducing heat costs and kiln time, reduction to a prescribed size, such as ½ inch size is important, but larger sizes such as 1 inch size or larger can be treated if increased processing costs are not a serious disadvantage.

In crushing to a prescribed size, for example, so that all passes through a ½ inch mesh screen, if that size is selected, there is inevitably produced many particles of smaller size ranging from dust through fines and up to the screen size. Freshly mined lignite when crushed, produces a lesser amount of dust and fines than lignite that has been exposed to the air. However, I have found that the fines produced by ordinary crushing of freshly mined or stored are not excessive and that lignite, as crushed usually has enough coarse and fine particles to serve well in the process. Merely by way of example, a charge, all of which passes a ½ inch mesh screen and containing about 20% of particles 80 mesh or finer produces an excellent fuel, when processed according to the present invention. However, classification of the charge to prescribed particle size analysis is not usually desirable, since to utilize such sizing and classifying steps merely adds to the cost without compensatory advantage. This is not to imply that carefully screened and sized particles are unsuitable in the process. On the contrary, good fuel can be obtained from such classified starting material by treatment according to my invention, since the hydrocarbon oil residuum produces a hardened plastic coating over the particles, regardless of whether or not the coating has fines and dust implanted throughout it.

To the lignite material there is then added the hydrocarbon oil, which can be added by spraying or dripping the oil on the charge.

The term hydrocarbon oil as used herein is intended to include petroleum hydrocarbons having fractions which are not volatile below about 500° F. to 700° F. Such hydrocarbon oils include crude petroleum itself or residues from partially refined crudes such as bunker oils, heavy black fuel oils, tarry residues, tar, asphaltum, pitch, road oils, diesel fuel oils and the like, which are liquid at ordinary temperatures or can be liquefied by heating.

The fractions which are non-volatile at the finishing temperature of the process, stay in the finished product and help form the mortar or coating which coats the fuel particles and binds the smaller particles and dust together on the larger particles. It is only necessary to provide enough hydrocarbon oil so that the available amount of fractions thereof which are non-volatile at the finishing temperature of the process, i. e. 500° F. to 750° F. and even higher, will form the mortar, referred to. An excess is not a disadvantage as all lower boiling fractions of the hydrocarbon oil are recovered in purified (refined) form, as hereinafter described. Hence, the process, in its entirety, offers a new method of refining petroleum crudes and fractions thereof and of utilizing low value petroleum supplies.

The total amount of such hydrocarbon oil that is added at the outset depends upon the amount of fractions, which are not volatile below about 500° F. to 750° F., that are present in the oil. The amount added should be sufficient to provide from about 3% to 10% or more by weight of residual oil in the finished product, if loading with residuum is economical, such oil residues being those which are not volatilized at the finishing temperatures of 500° F. to 750° F. However, the total amount of hydrocarbon oil that is added is never sufficient to submerge the solid lignite particle mass, nor is it sufficient to fill the interstices between the particles. On the contrary the mixture of raw crushed lignite and hydrocarbon oil is a particulate mass, the separate particles of which are merely smeared or coated, though not necessarily completely coated with the hydrocarbon oil additive. The mass thus prepared handles well in conveyors, mixers, screens and chutes, and tumbles and cascades well and without undue breakage or size degradation both before and while it is passed through the kiln, as hereinafter explained.

It has been found that a residual oil content in the pellet of 3½ will provide a pellet entirely satisfactory for industrial fuel. 4½ to 5% residual oil content provides a denser, harder pellet with a glossy surface, particularly adapted for domestic use having a heat content up to 11,750 B. t. u.

This residual oil content can be increased to at least 10%, increasing the heat content to over 12,000 B. t. u. if oil residuums are available for loading the pellets on a commercially economic basis.

Normally the percentage of oil added with the raw lignite is such as will provide the desired percentage of residual oil product in the pellet allowing for the evaporation of its more volatile fractions at the pelletizing temperature.

If heavy residuums are used less need be added since less will distill off. If lighter crude oils are used, more must be added since a larger percentage of the oil will distill off and go out with the steam. However, the total amount of hydrocarbon oil that is added must not destroy the particulate character of the mixture.

The finer particles of lignite in the charge form with the oil residuum a binding matrix or mortar which becomes plastic at from 500° F. to 550° F. so that it will agglomerate with the coarser particles, coating individual particles and binding several particles into a larger more or less rounded form. Where rounding of the agglomerates is desired, this effect may be accentuated by making the delivery end of the kiln (and if desired a portion of the directly heated section) smooth to accentuate this effect. The finer particles form with the dry, coarse particles a hard, dense agglomerate with the voids between the larger particles partially or completely filled and the whole shape more or less rounded with a smooth dense coating. The fine material normally produced when lignite is crushed to pass a particular size screen, such as ½ inch mesh will, for example, give excellent results in rounding out the larger particles in the mass.

This total mixture is then progressiveily heated to a temperature of above 500° F., thus about 600° F. which may, however, be increased to 700° F. and in some instances 750° F. By increasing the temperature to 600° F. from 3% to 5% of additional moisture is driven off with resultant marked increase in the heat value of the fuel as compared to heating to 300° F. Lignite dried to 300° F. will have a residual oxygen content varying from 10% to 12% which may in part represent residual molecularly bound water. It is, however, my considered conclusion that most lignites contain fractions of $H_xC_yO_z$ molecules that when broken down by heat, particularly in excess of 300° F. yield both $H_2O$ and $CO_2$, so in addition to 3% to 5% of moisture an appreciable amount of $CO_2$ is also eliminated at the increased temperature.

In heating the mixture economical commercial production requires rapid heat penetration into the lignite particles, large and small. I prefer to utilize a continuous flow method. In this preferred method the lignite-hydrocarbon oil mixture is introduced at ambient temperatures and then passed as a continuous flow through a treating chamber, the walls of which are heated to a gradually increased temperature toward the delivery end. The hottest part of the chamber walls are at temperatures considerably above the finishing temperatures to which the mixture is heated. The atmosphere in the treating chamber is composed of autogenously generated steam vapors (from the water present in the lignite) and oil vapors (evolved from the added hydrocarbon oil), as well as evolved $CO_2$ and other gases from the mixture and some air which inevitably enters with the mixture. This atmosphere is likewise heated and reheated by contact with the chamber walls and as a whole moves countercurrent to the flow of the lignite-hydrocarbon oil mixture in the chamber. All the while, the charge flows through the chamber it is continuously rolled upon itself and into and out of contact with the hot chamber walls and is tumbled and cascaded through the hot countercurrently moving atmosphere. The charge is progressed at such a rate that, considering the heat input, the larger lignite particles or at least the majority of them will have their interior portions brought up to about the finishing temperature which is a temperature in the range of 500° F. to 750° F. by the time the flow is discharged from the chamber.

The preferred form of treating chamber is a rotary kiln, preferably having deep longitudinal convolutions in its exterior walls, as for example disclosed in my application Serial No. 52,008, a substantial portion of the kiln being exposed to radiant heat of furnace firing. One form of such kiln, forming one phase of the present invention is illustrated herein. Thus, continuous treating chamber can be a rotary kiln, as indicated in Figure 1, comprising a tubular kiln 11 suitably supported on rollers 12 and 13, the kiln being rotated by means of drive pinion 14 and the bull gear 15 surrounding the kiln. On the interior of the kiln there are provided a series of flights 16 which serve to lift the material from the bottom of the kiln part way up to the top of the kiln as the latter is rotated and thus causing the charge to drop and cascade through the atmosphere in the kiln to effect efficient heat transfer. These flights 16 may extend from the entrance end of the kiln along all or part of the length of the kiln to the delivery end. Preferably, the flights may be in the form of deep convolutions in the kiln wall, shown in my application Serial No. 52,008 and may extend throughout all or part of the length of the kiln. Some of the kiln wall may be left smooth, as shown in my application Serial No. 144,804, to accentuate rounding of the agglomerates or a separate smooth rotary kiln into which the treated fuel is discharged may be used for smoothing and polishing the still hot agglomerates.

A furnace 18 is provided near the lower end of the kiln (sometimes designated the "furnace end") with a suitable refractory and insulated housing 19 which surrounds the major portion or "convection section" of the kiln. Heat is transferred by radiation and convection in the "furnace section" and by convection only throughout the remainder or "convection section." A stack 20 serves to take the products of combustion and discharge them to atmosphere. The kiln is thus heated indirectly by radiation from the furnace and by the products of combustion of the furnace 18, which pass up around the exterior of the kiln and are collected and discharged to atmosphere.

As shown, a hopper 21 is provided for feeding the previously described charge composed of a mixture of lignite and hydrocarbon oil as a continuous flow, the hopper which contains the mixture being discharged into the kiln by means of the conveyor 22 which may be of any variety, such as a screw conveyor. The liquid mineral hydrocarbon is fed onto the crushed lignite by means of a simple fuel pipe 23 controlled by valve 24 and terminating in a drip or spray nozzle 25 as the hopper is loaded and mixed with the lignite due to the action of feed screw 22.

A duct 30 is provided around the upper end of the kiln to collect the vapors given off in the kiln and conduct them to condenser 31. A flue 32 is provided for non-condensable gases which are vented to atmosphere. The condensate from the condenser is conducted by conduit 33 to liquid separator 34 which is provided with a lower discharge pipe 35, valve 36 and an upper discharge pipe 37 valved at 38. In this liquid separator the condensed water and oily distillation products are separated for recovery. Other forms of oil-water separators may be used.

In the drawing the kiln is shown broken off intermediate its ends, hence in actual practice the kiln is proportionately longer. It is made sufficiently long to provide requisite heat transfer.

Production of the improved fuel of the present invention on an economical commercial basis, requires large scale operation and maximum possible thermal efficiency. This is provided by the method and apparatus of the present invention, which by the continuous flow through the kiln, enables progressive, rapid, and efficient heating of the charge.

Thus, for example, using Dakota and similar lignites as the raw solid fuel there is involved the evaporation of about 36% to 40% of moisture. For a large commercial unit having a capacity of 50 tons of finished product per hour, there is required a feed of about 83 tons of 40% moisture content raw lignite per hour, and a transfer of over ten million B. t. u. of heat per hour to the kiln charge. A kiln for such commercial operation, constructed and operated in accordance with my invention, would therefore be about 200 feet long and about 12 feet outside diameter, with direct radiant heating provided by means of a firebox (designated 18—19 in the drawings), approximately 60 feet long, and the balance of the kiln length, approximately 140 feet, heated by convection, from the firebox flue gases. To obtain the required heat transfer, the kiln shell 11 where it passes through the firebox 18—19, must be maintained at as high a temperature as possible on the fire side of the shell. Such exemplary design is based on a tolerance of 2000° F. in the firebox as a necessary furnace temperature for efficient combustion of fuel with minimum excess air. The kiln shell itself does not reach this temperature, using presently available steels, a temperature of 900° F. to 1200° F. can be maintained on the inside of the kiln shell.

These conditions enable high and adequate heat transfer to the charge for commercial application.

While the charge composed of the mixture of lignite and hydrocarbon oil comes into contact with the hot shell of the kiln momentarily and periodically as the kiln rotates, thus providing a direct heat transfer to the solid particles and adherent hydrocarbon oil the heat so transferred will only be a small percentage of the total that is delivered to the charge moving through the furnace. Most of the heat is transferred by the kiln atmosphere which is composed of vapors and gases as previously described. This vaporous kiln atmosphere is heated and reheated continuously by contact with the shell and is maintained at from 800° F. to 1000° F. in the delivery section of the kiln (where it passes through the firebox), and temperatures grading down to a little above 212° F. at the feed end of the kiln.

The intense heating of the atmosphere in the firebox and of the kiln has two marked effects. (1) It provides a maximum temperature differential between the kiln atmosphere and the particles making up the moving charge and thereby permits rapid heat transfer to the particles for heating them through the core in a minimum of time for economical commercial production. This temperature differential is maintained as high as possible. (2) The transfer of heat to the kiln atmosphere serves as a means of carrying to the convection section of the kiln additional large quantities of heat for preheating and driving off most of the moisture from the continuously moving charge that moves countercurrent to the kiln atmosphere.

Most of the heat input to the moving charge for the purposes of preheating it and driving off most of the water is accomplished in the long convection section of the kiln beyond that part which is directly exposed to the firebox. In this convection section of the kiln the charge is raised from the atmospheric temperature, which may be cold to around 250° F., which is the approximate temperature of the moving charge as it enters the furnace end of the kiln. The kiln atmosphere is, of course, always higher than the average temperature of the moving charge at any point along the kiln. At a temperature of 250° F. most but not all of the water is evaporated from the lignite. In the long convection section of the kiln only the residual heat of the furnace gases are available for transfer through the walls of the kiln to the charge. The additional heat carried back to the charge by the heated kiln atmosphere provides a large percentage of the heat input to the charge as it is moving through the convection section. The kiln atmosphere, due to its large content of superheated steam, high specific heat, serves admirably as the vehicle to transfer the additional heat from the furnace end to the convection end.

As hereinbefore noted, by reducing the particle size of the lignite to sizes, for example, so as to pass 1" mesh screen, or better, ½" mesh screen, it is possible to get rapid heat penetration and also to obtain heat penetration without shattering the particles due to the high temperature differential between furnace atmosphere and particle.

It has been found that if crushed so as to all pass through a one-half inch mesh, an excellent product is produced which is useful for domestic fuel, either pelletized or briquetted and for industrial fuel, as with modern steam plant firing equipment, the product being clean and dustless, stable and storable fuel at this fineness. Such finished fuel is bone dry for all intents and purposes, has an exceeding low oxygen to carbon ratio and high calorific value, equalling good grades of bituminous coal.

Throughout the length of the kiln, the repeated cascading of the solid particulate charge through the heated kiln atmosphere causes all portions of the kiln solid charge and the atmosphere to be brought repeatedly into contact with each other and for both the solid charge and atmosphere to be brought into contact with the intensely heated kiln walls. Heat is therefore transferred from the kiln wall to the solid material flowing through the kiln by direct contact with the walls and by the action of the heated kiln atmosphere which is heated and reheated and moved countercurrent to the charge.

As the lignite is heated to about 200° F. a large percentage (but not all) of its natural moisture content is driven off and its carbon content becomes more and more activated and absorptive of hydrocarbon gases. Hence, at about the temperature of 200° F. and thereafter as the temperature of the lignite-hydrocarbon oil charge is elevated to the finishing temperature of about 500° F. to 750° F. the hydrocarbon fractions are absorbed (or adsorbed) within the mass and deactivates the lignitic material and maintains it a stable non-firing condition during the processing and thereafter. As the temperature rises above 200° F. hydrocarbon oil or vapors thereof are progressively taken up by the lignite that is activated by removal of the remaining moisture and $CO_2$. I have found that penetration of the hydrocarbon oil constituent into the lignitic material, sufficient to maintain the mass de-activated and non-firing, occurs continuously as the mass is progressively heated to higher and higher temperatures. Samples taken at any stage of the progressive heating of the mass in the kiln are completely stable in free air at the temperature of the sample as withdrawn. This is true even up to finishing temperatures.

It does not appear that the exchange of hydrocarbon oil and the evolved moisture and other constituents of the lignite is on a weight-for-weight basis, as a relatively small amount of the hydrocarbon oil is required, viz. from about 3% to less than 10%, preferably 3% to 7%, and an appreciable amount of the hydrocarbon oil remains on the surface of the final cooled product as a dry varnish-like covering in which dust and fines are embedded. The adsorbed (or absorbed) hydrocarbon oil, or vapors thereof may be considered more as a partial saturation of the activated carbon's capacity to adsorb (or absorb) such constituent. The final product has a much lesser tendency to adsorb gases and oxygen particularly and to become heated spontaneously in storage than does lignitic carbon which is produced without hydrocarbon vapors being present during the heating period. The invention does not require a quantitative exchange of hydrocarbon oil for the evolved water and $CO_2$ on a weight basis but it is evident that the hydrocarbon oil constituent does penetrate nearly or entirely through the pieces of finished lignitic fuel.

As a matter of interest it may be noted that the heating of raw lignite (without having hydrocarbon oil or its vapors present as herein described) in a drying kiln cannot be accomplished because the lignite "fires." Attempts have been made to dry lignite in kilns. Even with the lowest possible heat differential it is impossible to avoid ignition (or "firing" as it is sometimes designated herein.) Thus, in certain tests of this type, as lignite is heated it will ignite when its average temperature reaches 250° F. Lignite becomes exceedingly reactive as the moisture is driven off. It can be charred in a closed retort (out of contact with air), but must be cooled out of contact with air before the retort can be dumped, and even then it will reheat and spontaneously ignite if stored in bulk.

By my process and method of adding the hydrocarbon oil, another object of the invention is accomplished, namely the drying and pelletizing kiln becomes an oil refining and distillation means as well. Crude oil may be used as the hydrocarbon oil material. The fractions that go over (are vaporized) at the finishing temperature used, are recovered from the steam by condensation or other means, and forms a high value by-product utilizing the heavier fraction in the pelletizing process.

I have discovered and demonstrated by tests that the lignite acts as a catalytic agent promoting a cracking of the oil giving a higher yield of lighter fractions than is obtained by straight distillation of the same oil which adds considerable value to the combined process as an oil refining and distilling process, and claim this discovery as a feature of this invention.

Means are therefore added to recover the oil, this being indicated herein as the condenser 31 and separator 34. The crude oil is added with the lignite in such proportions that there remains in the pellets the desired percentage of the heavier fractions which are not volatilized at the finishing temperatures after the lighter fractions are distilled off. The pellets with the desired percentage of residuum oil product or binder are withdrawn from the hot end of the kiln through one of numerous cooling means available on the market or a modification of same, with or without heat recovery means, not shown.

The distilled vaporized higher fraction hydrocarbons leave the kiln at the feed end with the water vapor from which they are recovered by condensation or other means.

It may be noted that larger or more rounded pellets can be accomplished by designing the pelletizing section of the kiln so as to be longer or an auxiliary independent pelletizing section as a separate unit may be used, into which the drying section discharges its finished plastic charge. If desired, the finished product can be passed, while still hot and somewhat plastic to a conventional briquetting press for producing large briquettes.

The pellets are hard and rounded. Some are cemented together. The pellets do not feel oily to touch; there is no dust nor small particles for the dust and small particles are cemented onto the larger particles in the pelletizing. The product can be handled with the hands without the hands getting dirty. The particles can be cleaved with a sharp blade and when cut and polished show a dense hard surface. This product burns without disintegrating, and can be fired in all forms of mechanical stokers or by hand. It can be stored in bulk without danger of spontaneous ignition and rain water sheds off the particles as well or better than it does off of bituminous coal. The product "flows" well in chutes and mechanical feeding devices.

The product is representative of the improved fuels produced in accordance with this invention. Such fuels are substantially moisture free. Prolonged heating of the finished product at temperatures above the finishing temperature of the product yields only insignificant amounts of carbon dioxide, water of decomposition, tarry vapors and hydrocarbon gases. The oxygen-to-carbon ratio of the product finished at temperatures herein specified is of a value between that of sub-bituminous and bituminous coal.

The net heat value of the product is generally between 11,500 and 12,000 B. t. u. per pound, generally increasing towards the higher finishing temperature in the stated range of 500° F. to 750° F. The net heat value of the product is, of course, to some extent varied by the percentage of oily residuum remaining in the finished product, higher percentages tending to increase the net heat value. Where hydrocarbon oily residues are readily available at low cost there is no disadvantage involved in loading the product with more than 10% oily residue (based upon the weight of the finished product), but there is no processing advantage in so doing.

The kiln is operated so as to heat the charge to 500° F. or more. A favorable operating range is 500° F. to 700° F. No advantage appears to be gained beyond 750° F. A finishing temperature of around 600° F. gives excellent results. In the examples the finishing temperature was measured in the charge at the lower end of the kiln.

In respect to the time of treatment, it may be stated that the rate of flow through the kiln is adjusted so that the product is discharged from the treating zone when most of the largest solid particles in the treated charge have been brought to the selected finishing temperature in the range of 500° F. to 750° F. throughout most or all of the interior of the particles. It is the object at least to a substantial degree to obtain heat penetration and to attain the finishing temperature throughout at least most of the interior of the largest size particles. No exact control is required to determine penetration for each solid particle, and no harm is done if some of the larger particles are not heated completely throughout to the selected finishing temperature, since they will inevitably be so heated and treated on their surfaces. The heating is considered to be sufficiently uniform when particles of relatively uniform maximum size taken from the treated mass are determined that, on an average, to have been heated to substantially the selected finishing temperature in the range of 500° F. to 750° F. on the interior of such particles and when, by test, the moisture content of a representative sample of the finished product as determined by prolonged further heating at the finishing temperature is less than 3% for finishing temperatures of 750° F. and less than 6% for finishing temperatures of 500° F. Such traces as may be so evolved by prolonged test heating at finishing temperatures are believed to be produced by thermal decomposition and that it represents residual oxygen in the product, hence is not moisture in the ordinary sense. For all intents and purposes, the products are bone dry. Frequently, little or no moisture will be evolved even by prolonged further heating at more elevated temperatures.

In heating the charge the surfaces of the largest particles and the entire volume of particles of sizes smaller than the largest ones, in the mixture fed, inevitably reach and exceed the average finishing temperature. Thus, as the moving charge is repeatedly cascaded through the kiln atmosphere, which may be 800° F. to 900° F. and even higher in the firebox end of the kiln, the smaller particles and the surfaces of the larger particles will heat to temperatures well above the finishing temperature before the larger and coarser particles are heated throughout. This is an advantage, because the plasticity and adhesiveness of the smaller sized particles and surfaces of the larger particles at the higher temperatures aids in their adhesive attachment, thus enhancing the agglomeration of finished particulate masses which constitute the fuel. The adhesiveness is not very great, but is sufficient to bind the dust and fines to the larger particles, and they are smoothed and rounded to a greater or lesser degree by the rolling and cascading of the charge. Upon cooling the thus built up masses are strong, hard, dense, and clean and are smoother in shape than the starting pieces.

The superheated vaporous atmosphere of the kiln in general moves (countercurrent) from the firebox end to the feed end, where it is discharged, the lignite-hydrocarbon oil mixture meanwhile moving in the opposite direction from the feed to the furnace end where it is discharged. However, there is a recirculation of some of the vapors of the atmosphere. Thus, while water vapor seldom condenses on the charge and then only reluctantly upon momentarily cold solid material of the charge being fed into the kiln, some of the hydrocarbon oil vapors, which may have much higher temperature of vaporization, will condense upon the charge at some intermediate point between the feed and discharge ends of the kiln where they find temperatures on the surfaces of the solid charge material below the temperature of condensation of the particular oil vapor fraction at that point. The higher the temperature of condensation of the oil vapor, the closer will be the point of condensation toward the firebox end. Since the oily vapors may have a wide range of boiling points, such condensation may occur over a considerable intermediate length of the kiln. In condensing the hydrocarbon oil vapors yield significant quantities of heat to the counter moving solid charge, and in the condensed state the condensed hydrocarbon oil on the surfaces of the particles in the charge is carried along with the material flow toward the higher temperature end of the kiln, until upon reaching a zone of higher temperature in the kiln, the hydrocarbon oils will be again vaporized. Here again the zone of vaporization may spread over a considerable intermediate section of the kiln and the condensation and vaporization zones may overlap due to difference in boiling points of various oily fractions.

The rate of flow of solid material through the kiln is adjusted as follows: In any kiln, maximum efficiency is attained by maintaining maximum firebox temperatures; hence for best commercial operation I recommend the firebox temperature be held at as high a temperature as the materials of the exposed kiln wall will withstand. Then the rate of material flow is regulated and increased or decreased until the finished solid material discharged at the lower end of the kiln is delivered at the selected finishing temperature in the range stated. In general, as the rate of flow of charge is increased, the temperature of the finished charge will decrease. However, there is another factor: The rate of heating of the particles is determined by their size and by the difference in temperature between the particles of the mass and the temperature of the kiln walls, and more particularly, the temperature of the vaporous atmosphere in the kiln at each point along its length. Therefore, within limits greater rates of heat penetration and higher tonnages are possible with a given kiln or conversely, a shorter kiln may be employed for treating lignite crushed to smaller maximum sizes, than where larger maximum sizes are used. It is only necessary to bring the larger size particles up to or approximately up to finishing temperatures and the finer particles will a fortiori, likewise be finished throughout to adequate temperatures. No holding time, as such is required though holding is not a disadvantage. Time periods as short as one minute, at or near the finishing temperature is sufficient, since the work of forcing off water and $CO_2$ and the replacement by residues from the hydrocarbon oil is practically done during the gradual heating up period, and when the larger particles reach, or on an average reach or approach the finish temperature, the treatment is substantially complete. The overall time of passage through the kiln may vary widely under commercial operation from as low as one-half hour to several hours, depending upon the heat input to the kiln and rate of feed, both of which can be varied, and will vary in accordance with different sizes and designs of continuous kilns.

Batch processes, which are not commercially competitive with continuous processes, likewise require only that the largest particles in the charge be brought up to or approximately to a temperature in the finishing range while being tumbled. A few minutes after the batch has reached the finishing temperature it will be finished and can be dumped. I prefer and recommend the continuous process because of much lower costs, better control and vastly greater tonnages thereby made feasible.

The following examples will serve to illustrate the invention, but without limitation thereon, all examples being made on a small test plant basis and calculated on a ton production basis.

*Example I*

Raw lignite, 39.5% moisture, having a heating value of 6610 B. t. u. per pound, 3220 pounds; No. 2 diesel oil, 322 pounds, making a total kiln input of 3542 pounds. Output was 2000 pounds of hard, well-formed pellets having a heating value of 11,670 B. t. u. per pound; 1214 pounds water; 252 pounds water-clear distillate; and 76 pounds loss by difference to equal the 3542 pounds input. This loss consisted largely of uncondensed hydrocarbons, carbon dioxide and other inert gases from the raw lignite. The residual oil product in the pellets was calculated as 322 pounds input minus 252 pounds recovered, or 70 pounds or 2½%. A finishing temperature of 600° F. was used.

Example II

Raw lignite, 39.5% moisture having a heat value of 6610 B. t. u. per pound, 3180 pounds; Montana crude oil, 158 pounds; making a total input of 3338 pounds. Output was 2000 pounds of hard glossy pellets having a heat value of 11,710 B. t. u. per pound; 1240 pounds water; 60 pounds of water clear distillate; and 38 pounds unaccounted for by difference to equal 3338 pounds input. This loss would again be largely uncondensed hydrocarbon, carbon dioxide and other gases from the raw lignite.

The residual oil in the pellets was calculated at 158 pounds input minus 60 pounds recovered, or 98 pounds or 4.9%. A finishing temperature of 600° F. was used.

Example III

Raw lignite having a moisture content of 37.5% and having a heat value of 6812 B. t. u. per pound, 3034 pounds; No. 6 bunker oil, 164 pounds, making a total input of 3198 pounds. Output was 2000 pounds of hard glossy pellets having a heat value of 11,740 B. t. u. per pound; 1130 pounds of water; 38 pounds of water clear distillate and 30 pounds unaccounted for by difference to equal the 3198 pounds input.

The residual oil in the pellet was calculated as 164 pounds input minus 38 pounds recovered or 126 pounds or 6.3%. The finishing temperature was 600° F.

In all of the foregoing examples the charge was heated at substantially atmospheric pressure in a kiln atmosphere composed of autogenously generated superheated water vapor, hydrocarbon oil vapors, evolved $CO_2$ and evolved minor gases and air entrained in the charge. The charge was continuously tumbled against the kiln walls and then in the kiln atmosphere as it was heated. Within a few minutes after reaching finishing temperature (which in these examples was measured by simply measuring the temperature within the solid charge of the kiln), the charge was dumped from the kiln. In no instance was there any firing in the kiln or upon dumping.

As many apparently widely different embodiments of this invention may be made without departing from the spirit and scope thereof, it is to be understood that I do not limit myself to the specific embodiments herein.

What I claim is:

1. A storable stable lignite fuel formed of hard, dense, somewhat smoothed pellets of fairly uniform bulk having a dehydrated hard central chunk capable of passing through a screen not substantially exceeding one inch mesh, said particles being smooth and having a dense, clean surface composed of finer lignite particles cemented together with a residuum of hydrocarbon oil fractions which do not volatilize from the particles at a temperature in the range of 500° F. to 750° F., said residuum constituting from 2% to not substantially more than 10% of the weight of the particles, said fuel being further characterized by having a low oxygen content and low moisture-sorptive properties.

2. A storable stable lignite fuel composed of hard, dense, generally smoothed pellets of fairly uniform bulk having a dehydrated central particle of lignite of a size capable of passing through a screen of one inch mesh size, said central particle being covered with a dense, smooth, clean surface layer comprising an aggregate of dehydrated smaller lignite particles cemented together with hydrocarbon oil residuum, said hydrocarbon oil residuum being composed of fractions which do not volatilize from the particle at temperatures in the range of 500° F. to 750° F., said fuel being further characterized by being moisture resistant, having a low moisture-sorptive characteristic, a low oxygen to carbon ratio, and high net calorific value.

References Cited in the file of this patent

UNITED STATES PATENTS

| | | |
|---|---|---|
| 763,267 | Davis | Jan. 21, 1904 |
| 783,624 | Davis | Feb. 28, 1905 |
| 1,574,174 | Schoch | Feb. 23, 1926 |
| 1,607,012 | McCrea | Nov. 16, 1926 |
| 2,560,357 | Martin | July 10, 1951 |
| 2,610,115 | Lykken | Sept. 9, 1952 |

FOREIGN PATENTS

| | | |
|---|---|---|
| 631,355 | Great Britain | Nov. 1, 1949 |